United States Patent [19]

Senda et al.

[11] 3,983,147

[45] Sept. 28, 1976

[54] SEPARATION OF WOOL FATTY ACID

[75] Inventors: Hisakazu Senda; Toshiaki Yamamoto; Hiroshi Ueno; Kazuo Nakano, all of Kyoto, Japan

[73] Assignee: Dai-Ichi Kogyo Seiyaku Co., Ltd., Kyoto, Japan

[22] Filed: May 31, 1974

[21] Appl. No.: 475,110

[30] Foreign Application Priority Data
June 12, 1973 Japan................................ 48-66542
Aug. 7, 1973 Japan................................ 48-88974
May 4, 1974 Japan................................ 49-50103

[52] U.S. Cl....................... 260/412.8; 260/397.25; 60/417; 260/418; 260/425; 260/426
[51] Int. Cl.²........................... C11B 1/10; C11B 3/06; C11C 1/04; C07J 4/00
[58] Field of Search........ 260/414, 413, 425, 638 R, 260/412, 412.8, 426, 417, 397.25, 418

[56] References Cited
UNITED STATES PATENTS

| | | | |
|---|---|---|---|
| 2,211,139 | 8/1940 | Licata................................. | 260/414 |
| 2,302,679 | 11/1942 | Drekter et al. ................ | 260/397.25 |
| 2,365,915 | 12/1944 | Taylor.............................. | 260/638 R |
| 2,499,877 | 3/1950 | Porter............................. | 260/397.25 |
| 2,567,541 | 9/1951 | Black et al. ..................... | 260/638 R |
| 2,579,986 | 12/1951 | Vaterrodt et al. ................. | 260/412 |
| 2,619,495 | 11/1952 | Christenson et al. ............... | 260/426 |
| 3,526,647 | 9/1970 | Sunde et al. .................... | 260/397.25 |

FOREIGN PATENTS OR APPLICATIONS

| | | | |
|---|---|---|---|
| 1,535,699 | 7/1968 | France | |
| 55,505 | 6/1968 | Poland.......................... | 260/397.25 |
| 650,326 | 2/1951 | United Kingdom............ | 260/638 R |

OTHER PUBLICATIONS

"*Preparation and Solubility of Metal Soaps of Wool Wax Acids*" by W. R. Moble et al. – The Journal of the American Oil Chemists Soc., Jan. 1962 – Issue vol. 39, No. 1, pp. 31–32.

*Primary Examiner*—Winston A. Douglas
*Assistant Examiner*—P. E. Konopka
*Attorney, Agent, or Firm*—James C. Haight

[57] ABSTRACT

Wool fatty acid is effectively separated from wool alcohol or wool wax by treating a mixture of a multivalent metal soap of the fatty acid and the alcohol or wax with a heterogeneous system comprising a water phase and a water-immiscible solvent phase, and allowing the system to separate into respective phases.

8 Claims, No Drawings

SEPARATION OF WOOL FATTY ACID

This invention relates to a method of separation of wool fatty acid from wool alcohol or wool wax. Wool wax or wool fat consists chiefly of esters of higher fatty acids known as "wool fatty acid" with higher aliphatic mono-alcohols known as "wool alcohol". Saponification of wool wax produces mixtures of wool fatty acid and wool alcohol. Crude wool wax having a high acid value contains a large amount of free wool fatty acid. Usually, wool fatty acid is separated in the form of a salt, namely soaps with alkali or other metals. These soaps are insoluble in many conventional organic solvents, while wool alcohol or unsaponified wax is soluble therein. Extraction of the soluble alcohol or wax with such solvents is inefficient unless emulsification of the entire system is somehow prevented. This is because the soap and unsaponifiable matter are good emulsifiers themselves and are easily dispersed in the solvent containing wool alcohol.

Accordingly, it is an object of the present invention to provide a method of separation of wool fatty acid and wool alcohol from saponified wool wax which can avoid the foregoing difficulty.

It is another object of the present invention to provide a method of purification of crude wool wax having a high acid value by removing free wool fatty acid therefrom.

Further, objects and advantages of the present invention will be apparent as the description follows.

According to the present invention, wool fatty acid and wool alcohol may easily separated by saponifying wool wax so as to produce a metallic soap of wool fatty acid with a multivalent metal, and treating the resulting mixture with a heterogeneous system comprising water and a water-immiscible solvent. Better results may be obtained when a binary soap with the multivalent metal and an alkali metal is produced during the saponification step.

Formation of the metallic soap may preferably carried out in the following manner.

Wool wax is saponified by a conventional method using alkali metal hydroxide, carbonate or lower alkoxide and then the resulting soap is metathetically reacted with a multivalent metal hydroxide, oxide or a water-soluble salt thereof. Alternatively the metallic soap may be directly produced by saponifying wool wax with hydroxide, oxide or salt of the metal.

Any alkali metal hydroxide, carbonate or lower alkoxide used for conventional saponification reaction may be employed.

Examples of oxides, hydroxides or salts of the said multivalent metal are aluminum hydroxide, barium hydroxide, calcium hydroxide, magnesium hydroxide, calcium oxide, magnesium oxide, zinc hydroxide, calcium chloride, magnesium chloride, barium chloride, cobalt chloride, cupric chloride, stannous chloride, aluminum chloride, iron chloride, magnesium sulfate, aluminum sulfate, bleaching powder, alum, calcium acetate, magnesium acetate and the like.

The resulting soap may consist wholly of a metallic soap with the multivalent metal, or it may be a binary soap with an alkali metal and the multivalent metal. Such binary soaps may be produced by the aforementioned metathetical reaction of conventional alkali metal soaps with less than stoichiometric amounts of hydroxides, oxides or salts of the multivalent metal. The binary soap may also be formed either by directly saponifying wool wax with a mixture of alkali metal hydroxide, carbonate or lower alkoxide and the multivalent metal compound, or by reacting an excessive amount of alkali metal hydroxide, carbonate or lower alkoxide with the wholly metallized soap. The amount of the alkali metal compound may preferably be from 1 to 6 equivalents of the starting wool wax. The amount of multivalent metal compound must be greater than 0.5 equivalent of the starting wool wax and is preferably less than 3 equivalents of the wax.

The foregoing saponification and/or metallization may be carried out in a liquid system such as water, organic solvent or mixtures thereof, preferably in a heterogeneous system as hereinafter described.

The resulting mixture containing the metallic soap is then treated with a heterogeneous system comprising water and a water-immiscible solvent to separate the metallic soap from wool alcohol. The water phase may contain a water-miscible organic solvent such as methanol, ethanol, isopropanol, acetone, dioxane, ethylene glycol or propylene glycol. Examples of the water-immiscible solvents are aliphatic hydrocarbons such as n-hexane, iso-octane, petroleum ether or kerosene; aromatic hydrocarbons such as benzene, toluene or xylene; ketones other than acetone such as methyl ethyl ketone or methyl isobutyl ketone; higher alcohols such as n-butanol or isoamyl alcohol; esters such as methyl acetate, ethyl acetate or isopropyl acetate; and mixtures thereof. The proportion of such water-immiscible solvent to water may vary as long as the mixture forms a heterogeneous system and generally about 0.5 to 5 parts by weight of such solvent are mixed with 1 part by weight of water. About 2 to 30 parts, more preferably about 3 to 15 parts by weight of the heterogeneous system are used to treat the soap equivalent to 1 part by weight of the starting wool wax. 0.5 to 10 parts, preferably 1 to 5 parts by weight of water, and 1 to 20 parts, preferably 3 to 10 parts by weight of water-immiscible solvent, both based on the weight of the starting wool wax, are sufficient to treat the mixture.

Though the mixture of the soap and the wool alcohol may be added to the heterogeneous system after drying, it is more coveninet to reconstitute the system in situ by the adjusting proportion of water and/or water-immiscible solvent used in the saponfication step to the above-mentioned range.

The mixture is then thoroughly stirred in the heterogeneous system and allowed to stand, whereby the mixture separates into respective layers. The supernatant is the water-immiscible solvent layer containing wool alcohol. The metallic soap forms the middle layer leaving water as the bottom layer. This step may be carried out at a temperature of about 10° to 70°C.

The separated layers are recovered by decantation or filtration thereof, and the water layer is discarded while the supernatant and the middle layer are retained.

Wool alcohol may be recovered in a purified form by removing the solvent from the supernatant.

Pure wool fatty acid may be recovered by treating the middle layer with a strong acid such as hydrochloric acid or sulfuric acid and washing with water.

It has been observed that when water is present in the extraction system of wool alcohol from the mixture with the metallic soap of wool fatty acid, the solubility of the soap in the extraction solvent decreases remarkably. This reduces possibilities of emulsification of the entire system or facilitates wool alcohol transfer into the solvent phase so that the separation of wool alcohol from the soap is remarkably improved.

In a preferred embodiment of the present invention, the separation is further enhanced by salting out or centrifuging the mixture in the heterogeneous system. Examples of salts which may be used for this purpose are sodium chloride, potassium chloride, calcium chloride, barium chloride, aluminum chloride, zinc chloride, ferrous chloride, ferric chloride, sodium nitrate, sodium sulfate, sodium thiosulfate and the like. Generally less than 50% by weight, more preferably 5 to 30% by weight of the salt based on the weight of the starting wool wax is used.

Similarly, centrifugation of the mixture of the metallic soap with wool alcohol in the heterogeneous system improves the separation within a shorter time for complete separation. Any conventional centrifuge having a centrifugal force of 3,000 to 5,000 G may be utilized. Ultracentrifugation at greater than 10,000 G further decreases the necessary length of time for separation.

The above two separation methods may be used in combination. Thus, a clear supernatant solvent layer containing wool alcohol and a middle soap layer which is substantially free from the solvent and water may be obtained within a much shorter period of time.

Good separating effects similar to the above may also be obtained by the use of the binary soap. As already mentioned, the amount of multivalent metal compound must be greater than 0.5 equivalent of the starting wool wax. Since a substantial part of the alkali soap must be present as the binary soap, the ratio of the multivalent metal compound to the alkali metal compound is preferably less than 0.9 equivalent. The optimal value of this ratio varies with the respective combination of the alkali metal and the multivalent metal and is shown in the following table.

| Multivalent metal | Alkali metal Na | K |
|---|---|---|
| | Multivalent:Alkali Ratio | |
| Ca | 0.66 | 0.75 |
| Mg | 0.73 | 0.81 |
| Ba | 0.77 | 0.88 |
| Al | 0.71 | 0.77 |

Thus, the major part of the soap is multivalent metal soap and the remainder is alkali metal soap. The presence of minor parts of the alkali metal soap results in good separation of the soap from the alcohol in the system. The metallic soaps are generally lipophillic and are, therefore, easily dispersed in water-immiscible solvents containing wool alcohol as lipophillic micelles. The alkali metal soap will turn the micelles into a hydrophillic phase which may easily form a separate phase by agglomeration.

The method of the present invention is applicable to the recovery of wool fatty acid and wool alcohol from crude wool wax having a high acid value. Such crude wax is obtained when washings of wool fibers are acidified to recover the wax. This type of wool wax contains a large amount of free fatty acid, for example, of 5 to 15% or more (acid value >5) and is utilized as the starting wool wax of the present invention by using an additional amount of alkali metal and/or multivalent metal compound corresponding to the content of the free fatty acid.

Furthermore, if the amount of said alkali metal compound and/or multivalent metal compound is restricted to the extent sufficient to neutralize the free fatty acid contained in the crude wax and the resulting mixture is treated in the same manner as described, the free fatty acid may be separated from purified wool wax. In this case, the amount of multivalent metal compound being greater than 0.3 equivalent relative to said free wool fatty acid present in the crude wax but less than 0.9 equivalent relative to the alkali metal compound, and may preferably be from 0.3 to 1.5 equivalents of the content of the free acid on the one hand and from 0.5 to 0.9 equivalent of the amount of alkali metal compound used for neutralization on the other hand. The starting wool wax may be neutralized in the form of a grease, melt or solution in an organic solvent such as ethyl acetate, methyl ethyl ketone or ethanol. The neutralization and the metallization may preferably be carried out at a temperature of 20° to 50°C. Care should be taken to prevent the wax from being saponified, which will take place by the use of excess neutralizing agent at a higher temperature. During this step, the wax may be bleached with a suitable bleaching agent such as hydrogen peroxide. The resulting mixture is then treated with the heterogeneous system comprising water and water-immiscible solvent in the same manner as hereinbefore described.

Thus purified wool wax may be recovered from the supernatant layer. The fatty acid may also be recovered from the middle layer by decomposing the metallic soap into the free acid.

The following examples are offered for illustration only, and are not intended to limit the scope of the present invention, which is defined in the claims below.

Throughout the specification and claims, the content of free fatty acid is calculated by assuming the average molecular weight of the acid as being 330.

The term "equivalent" used in the examples to represent the amounts of alkali metal or multivalent metal compounds means an amount sufficient to convert the total amounts of the fatty acid, either in the free or bund form, into the salt thereof, or to convert the free fatty acid into the salt, as the case may be.

All parts and percents therein are by weight.

EXAMPLE 1

100 part of wool wax (cholesterol content 17.9%) are added to 400 parts of a solution of 16 parts of sodium hydroxide in 90% ethanol and the mixture is refluxed for 6 hours. The reaction mixture is adjusted at pH 8.5 with hydrochloric acid and ethanol is removed in vacuo. 400 parts of ethyl acetate and 200 parts of water are added to the residue and the mixture is stirred for 30 minutes at 60°C. A solution of 12 parts of calcium chloride dihydrate in 100 parts of water is added to the mixture at the same temperature to yield calcium soap by metathesis. The resulting mixture is cooled to 20°C, stirred for 30 minutes and allowed to stand overnight, whereby the mixture separates into three layers. The supernatant and the middle layers are retained by decanting and filtering the mixture. Solvent is removed from the supernatant layer whereby 40.2 parts of wool alcohol are obtained. The acid value and the cholesterol content thereof are 6.5 and 31.9% respectively. The middle layer, which was obtained by filtering the remaining layers, is added to 100 parts of water and the mixture is acidified to pH 4.0 with hydrochloric acid, washed with 100 parts of water 3 times and dried, whereby 58.5 parts of wool fatty acid (acid value 145.2) are obtained.

EXAMPLE 2

100 parts of wool wax (cholesterol content 16.2%) and 50 parts of 5N aqueous suspension of calcium hydroxide are charged in an autoclave. The mixture is heated for 10 hours at 185°C under pressure. After the reaction has completed, 10 parts of the resulting saponified product are worked up with a mixture of 30 parts of ethyl acetate and 15 parts of water. As a control, 10 parts of the same product are worked up with 30 parts of ethyl acetate without using water. Both mixtures are warmed to 60°C, adjusted to pH 9.0 with hydrochloric acid, stirred for 30 minutes and allowed to stand at 25°C overnight respectively. Supernatant is collected by decantation and wool alcohol is obtained by removing the solvent and drying in vacuo respectively. The acid value of the respective alcohol is determined. The alcohol treated with ethyl acetate and water showed an acid value of 6.8, whereas the product treated with ethyl acetate alone showed an acid value of 11.2. It can be seen from the above comparative test that the use of heterogeneous system of the present invention improves the separation rate.

EXAMPLE 3

100 parts of wool wax (cholesterol content 16.2%) and 50 parts of 5N aqueous suspension of calcium hydroxide are charged in an autoclave. The mixture is heated for 10 hours at 180°–190°C under pressure. 200 parts of water and 500 parts of methyl ethyl ketone are added with stirring to the reaction mixture. The mixture is taken up in a vessel and adjusted at pH 8.5 with hydrochloric acid. To the mixture are added 10 parts of sodium chloride and the resultant mixture is stirred for 1 hour and allowed to stand overnight at room temperature. The resulting three layers are separated by decantation and filtration thereof. Solvent is removed from the supernatant layer to give 42.7 parts of wool alcohol (acid value 4.9, cholesterol content 29.9%).

The middle layer which was filtered off from the remaining layers is adjusted to pH 4.0 with hydrochloric acid in 100 parts of water. After the water layer is removed, the resulting product is washed with 100 parts of water 3 times and dried, whereby 56.3 parts of wool fatty acid (acid value 147.1) are obtained.

EXAMPLE 4

100 parts of wool wax (cholesterol content 15.8%) and 100 parts of 5N sodium hydroxide solution in water are charged in a autoclave. The mixture is heated for 10 hours at 180° – 190°C. After the reaction is completed, 10 parts of the resulting saponified product are added to a mixture of 50 parts of methyl ethyl ketone and 25 parts of water and adjusted to pH 9.0 with hydrochloric acid while stirring at 60°C. The sodium soap therein is then converted to calcium soap by reacting with 1.5 equivalents of calcium chloride dihydrate. To the resulting mixture are added 2 parts of sodium chloride, and it is then stirred for 30 minutes at 60°C and allowed to stand overnight. The resulting supernatant is collected by decanting and evaporated to remove the solvent. The residue is dried in vacuo.

The same saponified product is treated in the same manner except that sodium chloride is not used. The acid value of the resulting wool alcohol using sodium chloride was 4.5, whereas that of the product obtained without using sodium chloride was 6.7. Thus, it is apparent that salting out with sodium chloride is effective for the separation of wool alcohol from wool fatty acid.

EXAMPLE 5

100 parts of wool wax (cholesterol content 15.8%), 50 parts of methyl isobutyl ketone and 100 parts of 5N aqueous solution of potassium hydroxide are reacted in an autoclave at 180° – 190°C for 6 hours. After the reaction the pH is adjusted to 9.0 with hydrochloric acid. The reaction mixture is then transferred to a vessel while washing with 100 parts of water and 350 parts of methyl isobutyl ketone. A solution of 17.5 parts of barium chloride dihydrate in 50 parts of water (55°C) is added to the vessel to convert the potassium soap to barium soap. The reaction mixture is centrifuged to give three layers and the supernatant and the middle layer are collected by decantation.

The supernatant solvent layer is distilled to give 47.8 parts of wool alcohol (acid value 5.3, cholesterol content 32.2%).

The middle layer is adjusted to pH 4.0 with hydrochloric acid, washed with 100 parts of water 4 times and dried, whereby 51.5 parts of wool fatty acid (acid value 159.8) is obtained. The yields of wool fatty acid and wool alcohol in the example are higher than those in Examples 1 or 3.

EXAMPLE 6

100 parts of wool wax (cholesterol content 16.2%) and 50 parts of 5N aqueous suspension of calcium hydroxide are reacted in an autoclave at 180° – 190°C for 6 hours. After the reaction, each 10 parts of the saponified product is worked up with 30 parts of methyl ethyl ketone and 15 parts of water, warmed to 60°C, adjusted to pH 9.0 with hydrochloric acid, stirred for 30 minutes and then centrifuged at various centrifugal forces. The necessary times for obtaining complete separation are as follows:

| Centrifugal force | Time |        |      |
|---|---|---|---|
| 3,000 G | 10 min. | 20 | sec. |
| 6,000 G | 2 min. | 15 | sec. |
| 10,000 G | | 30 | sec. |
| 15,000 G | | 10 | sec. |

Thus, centrifugation at greater than 10,000 G is very effective to obtain fast separation.

EXAMPLE 7

100 parts of wool wax, 13.7 parts of sodium hydroxide (1.80 equivalents to the wool wax) and 80 parts of water are charged in an autoclave and saponified at 180°C for 3 hours. To the resulting mixture are added 400 parts of methyl ethyl ketone, 120 parts of water and 16.1 parts of calcium chloride dihydrate (1.15 equivalents to the wool wax, 0.64 equivalent to sodium hydroxide) to convert the sodium soap to calcium soap. The resulting supernatant layer containing wool alcohol and the aqueous layer containing precipitates of the calcium soap are separated by decantation. When solvent is removed from the supernatant layer, 44.5 parts of wool alcohol having a hydroxyl value of 153.8 are obtained. 53.7 parts of wool fatty acid having an acid value of 161.2 are obtained by decomposing the calcium soap with hydrochloric acid.

EXAMPLE 8

100 parts of wool wax, 12.2 parts of sodium hydroxide (1.60 equivalents to the wool wax), 36.2 parts of barium hydroxide octahydrate (1.20 equivalents to the wool wax, 0.75 equivalent to sodium hydroxide) and 150 parts of water are charged in an autoclave and saponified at 165°C for 6 hours. To the resulting mixture are added 550 parts of ethyl acetate and 100 parts of water. The resulting two layers are separated by decantation. 47 parts of wool alcohol (hydroxyl value 148.4) and 50.5 parts of wool fatty acid (acid value 152.7) are obtained from the respective layers.

EXAMPLE 9

100 parts of wool wax, 16 parts of potassium hydroxide (1.49 equivalents to the wool wax) and 260 parts of 95% ethanol are charged in an autoclave. The mixture is saponified at 130°C for 8 hours. To the resulting mixture are added 350 parts of toluene, 200 parts of water and 21.2 parts of magnesium chloride hexahydrate (1.10 equivalents to the wool wax, 0.73 equivalents to potassium hydroxide) to convert the potassium soap to magnesium soap. The resulting supernatant toluene layer and the aqueous ethanolic layer are separated by decantation. 49 parts of wool alcohol having a hydroxyl value of 141.0 and 47.3 parts of wool fatty acid having an acid value of 158.5 are obtained from the respective layers.

EXAMPLE 10

100 parts of wool wax, 8.0 parts of calcium oxide (1.50 equivalents to the wool wax) and 200 parts of water are charged in an autoclave. The mixture is saponified at 175°C for 5 hours. To the resulting mixture are added 19.0 parts of sodium hydroxide (the equivalent value of calcium oxide to sodium hydroxide is 0.60) and 450 parts of n-butanol successively. The resulting two layers are separated by decantation. 46.7 parts of wool alcohol having a hydroxyl value 144.2 and 50.2 parts of wool fatty acid having an acid value of 160.2 are obtained from the respective layers.

EXAMPLE 11

100 parts of crude wool wax obtained by the acid treatment of washings of wool having an acid value of 35.2 (corresponding to 20.7% of free fatty acid) are reacted with 12.9 parts of sodium hydroxide (1.5 equivalents to the crude wool wax) in 80 parts of water in an autoclave at 160°C for 6 hours under pressure. To the resulting mixture are added 350 parts of ethyl acetate, 23.8 parts of calcium chloride dihydrate (1.5 equivalents to the crude wool wax) and 100 parts of water and the mixture is stirred at 50°C for 30 minutes to convert the sodium soap to calcium soap. The resulting mixture is allowed to stand at 20°C overnight, whereby the system separates into three layers. The supernatant layer and the middle layer are collected by decantation and filtration. The supernatant is distilled to remove the solvent to obtain 35.3 parts of wool alcohol having an acid value of 7.8. The middle layer is adjusted to pH 3.2 with hydrochloric acid and the resulting oil layer is washed with water and dried. Thus 63.2 parts of wool fatty acid having an acid value of 141.9 are obtained.

EXAMPLE 12

100 parts of a crude wool wax having an acid value of 56.5 (corresponding to 33.3% of free fatty acid), 39.8 parts of barium hydroxide octahydrate (1.1 equivalents to the crude wool wax) and 120 parts of water are charged in an autoclave. The mixture is heated at 185°C for 8 hours. 410 parts of methyl isobutyl ketone and 130parts of water are added to the reaction mixture. After 12 parts of sodium chloride are added, the mixture is stirred for 1 hour and then allowed to stand overnight. 30.6 parts of wool alcohol having an acid value of 4.6 and 65.2 parts of wool fatty acid having an acid value of 146.1 are obtained from the resulting supernatant and the middle layer respectively.

The same procedure is repeated without using sodium chloride. The resulting wool alcohol showed an acid value of 6.2.

EXAMPLE 13

100 parts of crude wool wax having an acid value of 47.3 (corresponding to 27.8% of free fatty acid), 15 parts of potassium hydroxide (1.2 equivalents to the crude wool wax) and 100 parts of water are heated at 150°C for 6 hours. After the reaction, 400 parts of methyl ethyl ketone, 200 parts of water and 34 parts of magnesium chloride hexahydrate are added to the reaction mixture to convert the potassium soap to magnesium salt. The mixture is centrifuged at 10,000 G for 30 seconds. 30.5 parts of wool alcohol having an acid value of 5.7 and 67.9 parts of wool fatty acid having an acid value of 151.6 are recovered from the resulting supernatant and the middle layer respectively.

EXAMPLE 14

150 parts of crude wool wax having an acid value of 47.3 (27.8% of free fatty acid), 150 parts of calcium oxide (1.2 equivalents to the crude wool wax) and 150 parts of water are mixed and heated at 170°C for 10 hours. After 300 parts of n-butanol are added, the reaction mixture is stirred and centrifuged (4,000 G) for 10 minutes. 48.5 parts of wool alcohol having an acid value of 6.1 and 97.3 parts of wool fatty acid having an acid value of 148.4 are recovered from the resulting supernatant and the middle layer.

EXAMPLE 15

100 parts of crude wool wax having an acid value of 35.2 are added to a solution of 14.5 parts of potassium hydroxide (1.2 equivalents to the crude wool wax) in 80 parts of water. The mixture is heated at 155°C for 4 hours. To the reaction mixture are added 350 parts of isopropyl acetate, 120 parts of water and 23.6 parts of barium chloride dihydrate (0.9 equivalents to the crude wool wax). The mixture is stirred at 50°C for 30 minutes. The resulting barium soap precipitates in the aqueous layer which is separated out from the supernatant by decantation. 33.0 parts of wool alcohol having an acid value of 7.2 and 65.2 part of wool fatty acid having an acid value of 145.3 are recovered from the respective layers.

EXAMPLE 16

100 parts of crude wool wax having an acid value of 56.5, 9.1 parts of sodium hydroxide (1.0 equivalent to the crude wool wax), 4.5 parts of calcium oxide (0.71 equivalent to the crude wool wax) are mixed in 150 parts of water. The mixture is heated at 160°C for 8 hours. To the reaction mixture are added 350 parts of ethyl acetate and 50 parts of water. The mixture is stirred at about 50°C for 30 minutes whereupon the ethyl acetate layer containing wool alcohol and the calcium soap layer separate easily. After separating two layers of decantation, 31.5 part of wool alcohol having an acid value of 5.5 and 67.3 parts of wool fatty acid having an acid value of 150.6 are recovered from the respective layers.

EXAMPLE 17

120 parts of crude wool wax having an acid value of 35.2 are reacted with 5.6 parts of calcium oxide (1.0 equivalent to the crude wool wax) in 100 parts of water in an autoclave at 175°C for 7 hours. To the reaction mixture are added 400 parts of methyl ethyl ketone, 17.8 parts of potassium hydroxide (1.6 equivalents to the crude wool wax) in 100 parts of water. The mixture is stirred at 50°C for 1 hour. The resulting solvent layer containing wool alcohol and the aqueous layer containing calcium soap are separated by decantation. 40.4 parts of wool alcohol having an acid value of 4.3 are recovered from the former, and 77.5 parts of wool fatty acid having an acid value of 155.2 are recovered from the latter.

EXAMPLE 18

100 parts of crude wool wax having an acid value of 56.5 are saponified with 7.6 parts of sodium hydroxide (1.2 equivalents to the crude wool wax) in 200 parts of isopropanol at 100°C for 6 hours. To the reaction mixture are added 250 parts of water, 350 parts of benzene and 14.5 parts of magnesium chloride hexahydrate (0.9 equivalent to the crude wool wax). The mixture is stirred at 50°C for 30 minutes. The resulting benzene layer containing wool alcohol and the aqueous layer containing magnesium soap are separated by decantation. 32.5 parts of wool alcohol (acid value 6.8) and 66.3 parts of wool fatty acid (acid value 140.2) are recovered from the respective layers.

EXAMPLE 19

119 parts of crude wool wax having an acid value of 35.2 (20.7% of free fatty acid) is melted at about 50°C. 3.0 parts of sodium hydroxide (1.00 equivalent to the free fatty acid) in 10 parts of water are added with stirring to neutralize the wax. To the mixture are added 500 parts of ethyl acetate 200 parts of water and then 3.8 parts of calcium chloride dihydrate (0.69 equivalent to sodium hydroxide), whereby the sodium soap formed is converted to calcium soap. The resulting ethyl acetate layer containing wool wax and the aqueous layer containing the calcium soap are separated by decantation respectively. 93 parts of purified wool wax (acid value 5.6) are obtained by removing the solvent from the former, and 25.5 parts of wool fatty acid (acid value 147.2) are obtained by acidifying the latter to a pH of less than 3 with hydrochloric acid.

EXAMPLE 20

90 parts of crude wool wax having an acid value of 47.3 (27.8% of free fatty acid), 100 parts of isopropanol, 2.1 parts of calcium oxide (1.00 equivalent to the free fatty acid) and 50 parts of water are stirred at 40°C for neutralization to give calcium soap of the fatty acid. To the mixture are added 450 parts of n-hexane, 200 parts of water and then 4.5 parts of sodium hydroxide (the equivalent value of calcium oxide to sodium hydroxide is 0.67). The resulting n-hexane layer containing wool wax and the aqueous isopropanol layer containing the calcium soap are treated as Example 19, whereby 61.5 parts of purified wool wax (acid value 6.2) and 27.5 parts of wool fatty acid (acid value 142.8) are obtained.

EXAMPLE 21

140 parts of crude wool wax having an acid value of 56.5 (33.3% of free fatty acid) are dissolved in 700 parts of n-butanol. A mixture of 10.0 parts of potassium hydroxide (1.25 equivalents to the free fatty acid) and 3.4 parts of magnesium hydroxide (0.72 equivalent to potassium hydroxide) in 20 parts of water are added to the solution. The mixture is stirred at room temperature for neutralization to give magnesium soap of the fatty acid. After 400 parts of water are added, the mixture is centrifuged. 88.5 parts of wool wax (acid value 4.3) are recovered from the resulting butanol layer and 49.0 parts of wool fatty acid (acid value 152.6) are recovered from the resulting aqueous layer respectively. The wool wax thus obtained is further purified in a conventional manner by washing with alkali, bleaching and deodorizing, whereby purified lanolin having an acid value of 0.4 is obtained in a yield of 95.3%.

EXAMPLE 22

150 parts of wool wax cream (65.3% of wool wax, 14.2% of free fatty acid and 20.5% of water) are dissolved in 600 parts of methyl ethyl ketone. To the solution are added 3.1 parts of sodium hydroxide and 15 parts of 30% aqueous solution of hydrogen peroxide. The mixture is stirred at 50°C for the neutralization and bleaching of the wax. 7.6 parts of barium chloride dihydrate (0.80 equivalent to sodium hydroxide) are reacted with the mixture to form the barium soap of the fatty acid. 260 parts of water are added to the mixture whereby the system separates into methyl ethyl layer and aqueous layer containing the barium soap. The respective layers are collected by decantation. 96 parts of pale yellow wool wax (acid value 3.6) and 20.5 parts of wool fatty acid (acid value 149.4) are recovered from the respective layers.

Various other examples and modification of the foregoing examples can be devised by the person skilled in the art after reading the foregoing disclosure and the appended claims without departing from the spirit and scope of the invention. All such further examples and modifications thereof are included within the scope of said claims.

What is claimed is:

1. In a method for separating wool fatty acid from wool alcohol by treating a saponified wool wax containing a soap of said wool fatty acid with a heterogeneous solvent system consisting essentially of an aqueous phase and a water-immiscible solvent for said wool alcohol to extract said wool alcohol into said water-immiscible solvent, phase separating the resultant admixture into a supernatant consisting essentially of wool alcohol dissolved in said water-immiscible solvent and said aqueous phase containing said soap of wool fatty acid and recovering respective phases therefrom, the improvement which comprises:

treating a saponified wool wax containing said wool alcohol and a binary metal soap of said wool fatty acid with said heterogeneous solvent system, said binary metal soap being formed with an alkali metal and a multivalent metal present in said saponified wool wax, the equivalent ratio of said multivalent metal being less than 0.9 relative to said alkali metal and greater than 0.5 relative to said wool wax.

2. A method according to claim 1, wherein said heterogenous solvent system is a mixture of about 0.5–5 parts by weight of said water-immiscible solvent per 1 part by weight of water.

3. A method according to claim 1, wherein the amount of said alkali metal present in said saponified wool wax is about 1 to 6 equivalents relative to said wool fatty acid.

4. A method according to claim 1, wherein said binary metal soap is prepared by metathetically reacting an alkali metal salt of saponified wool wax with a multivalent metal hydroxide, oxide, or water-soluble salt.

5. A method according to claim 1, wherein said binary metal soap is prepared by saponifying wool wax with a mixture of (i) an alkali metal hydroxide, carbonate or lower alkoxide and (ii) a multivalent metal hydroxide, oxide or water-soluble salt.

6. A method according to claim 1, wherein said binary metal soap is prepared by reacting an alkali metal hydroxide, carbonate or lower alkoxide with a multivalent metal salt of saponified wool wax.

7. A method according to claim 1, wherein said binary metal soap is recovered, further comprising treating said soap with a strong acid and washing with water to recover pure wool fatty acid therefrom.

8. A method for removing free wool fatty acid from crude wool wax containing at least 5% by weight of said wool fatty acid therein which comprises
   a. neutralizing said free fatty acid present in said crude wax with an alkali metal hydroxide, carbonate or lower alkoxide and a multivalent metal hydroxide, oxide or water-soluble salt to produce a binary metal soap of said wool fatty acid, the amount of said multivalent compound being greater than 0.3 equivalent relative to said free wool fatty acid present in said crude wax but less than 0.9 equivalent relative to said alkali metal compound;
   b. treating the resultant mixture with a heterogeneous solvent system consisting essentially of an aqueous phase and a water-immiscible solvent for pure wool wax to extract said pure wool wax into said water-immiscible solvent; and
   c. separating the resultant aqueous phase containing said binary metal soap from the supernatant consisting essentially of purified wool wax dissolved in said water-immiscible solvent.

* * * * *